Aug. 4, 1953　　　H. R. RICHARDS　　　2,647,551
TRACTION DEVICE
Filed Jan. 25, 1950
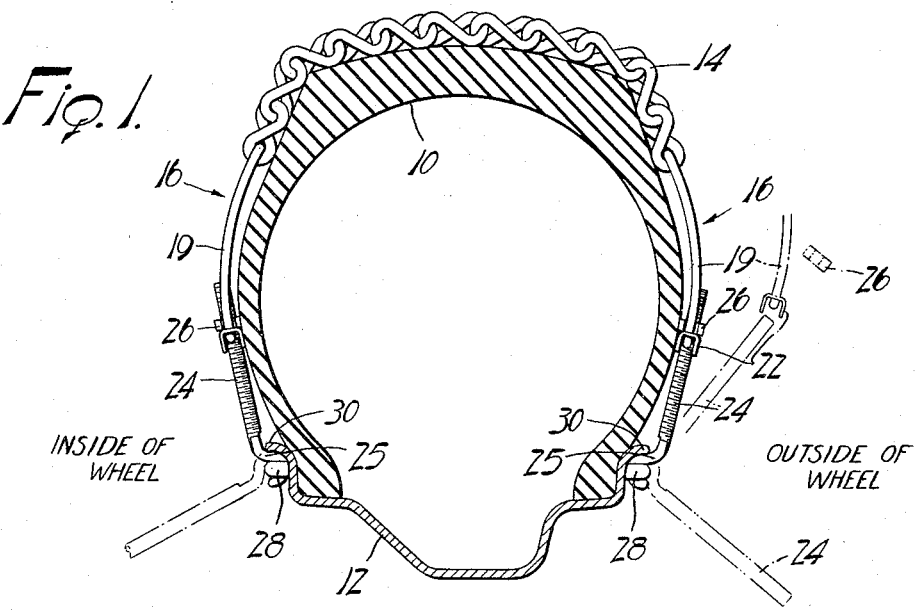
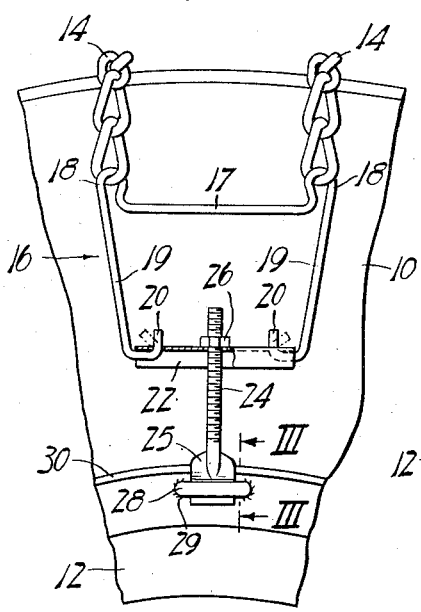
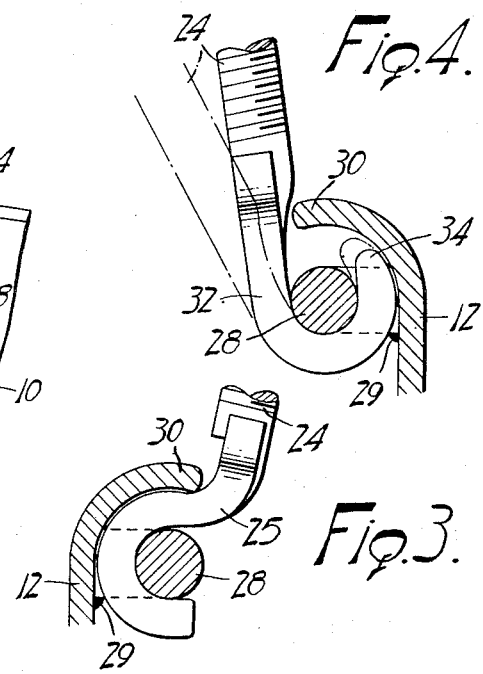
INVENTOR
Henry R. Richards
BY
Bean, Brooks, Buckley & Bean.
ATTORNEYS Patented Aug. 4, 1953

2,647,551

UNITED STATES PATENT OFFICE 2,647,551

TRACTION DEVICE

Henry R. Richards, Buffalo, N. Y.

Application January 25, 1950, Serial No. 140,417

2 Claims. (Cl. 152—236)

This invention relates to traction chain devices for automotive vehicles and the like, and more particularly to tire cross chains of the type sometimes referred to as "mud hooks" and means for fastening such devices to the vehicle wheel.

One of the objects of the invention is to provide improved means for detachable connection of cross chains to vehicle wheels as aforesaid.

Another object of the invention is to provide an improved type "mud hook" or cross chain device which is adapted to be mounted upon a vehicle tire in improved manner.

Still another object of the invention is to provide in a traction chain device improved means for handling the device incidental to mounting and dismounting thereof relative to the vehicle wheel.

Other objects and advantages of the invention will appear in the specification hereinafter.

In the drawing:

Fig. 1 is a sectional view through a wheel rim and pneumatic tire of conventional form, showing a "mud hook" device of the invention arranged thereon;

Fig. 2 is a fragmentary side elevation of the assembly of Fig. 1;

Fig. 3 is a fragmentary view, on an enlarged scale, of the detail of Fig. 1 showing one of the detachable connection devices of the "mud hook" to the wheel rim; and Fig. 4 is a view corresponding to Fig. 3 but showing another form of detachable connection arrangement.

As shown in the drawing, the traction chain unit of the invention is illustrated as being mounted in conjunction with a pneumatic tire 10 which is carried upon a vehicle rim 12. The mud hook device of the invention is indicated as generally comprising a pair of parallel cross chains 14—14 each of which are formed of twisted links in the manner of conventional cross chain arrangements in present day tire chain practice. In fact, the cross chains 14—14 as shown in the drawing are of the type which may be readily purchased from service or gas stations or the like for conventional cross chain replacement purposes.

The cross chain elements 14—14 are interconnected at their opposite ends by means of novel bracket devices which are indicated generally at 16—16, each of which is formed of wire bent into inverted U-shape with a cross handle portion 17 terminating in eye portions 18—18 at the upper corners thereof for engagement with the corresponding end of the cross chain elements 14. The leg portions 19—19 of the brackets 16 extend generally downwardly and in parallel spaced relation and terminate in reversely bent upturned end portions 20 which are shaped to hook into suitable openings formed in a cross bar member 22 which is centrally bored to receive the threaded end portion 24 of a hook device 25 (Figs. 1, 2, 3). A nut 26 is threaded upon the upper end of the hook portion 24 for tensioning the mud hook device relative to the tire tread subsequent to assembly thereon, as will be explained more fully hereinafter.

As illustrated in the drawing, the rim member 12 of the vehicle wheel is provided with paired yoke devices 28 at opposite sides thereof and at intervals therearound; the yoke devices 28 comprising wire stock bent into generally U-shaped form and welded or otherwise suitably attached as indicated at 29 at the opposite leg portions thereof into firm connection with the rim structure. Thus, each yoke member comprises a pair of leg portions extending substantially normal to the side view surface of the wheel rim and interconnected by a central body portion running parallel to the side wall portion of the wheel rim; and the yoke members are each so dimensioned and formed as to dispose the central body portion thereof at sufficient distance away from the side wall of the rim and below the outwardly curving top edge 30 of the rim so as to make room between the yoke device and the curving rim edge to accommodate the hook portion 25 in free sliding and rotating relation therebetween (Fig. 3).

The mud hook of the invention may be conveniently attached to a fully inflated tire mounted on a wheel upon which a vehicle may be standing, by first engaging one of the hook end portions of the device upon a yoke member at the inside face of the wheel rim. Thus, as illustrated in Fig. 1, one of the bracket members 16 may be grasped by one hand of the operator and carried into position (as shown in broken lines at the left hand side of Fig. 1) inside of the vehicle tire. While in this attitude the nose portion of the hook 25 is slipped inwardly into the space between the yoke 28 and the rim edge 30. The opposite end of the mud hook device is then pulled upon from the outside of the wheel by the operator's other hand so as to slide the cross chain elements 14 over the tread portion of the tire, thereby swinging the inner bracket 16 inwardly against the side of the tire wall. This rotates the inside hook device 25 relative to the yoke 28 into the solid line position thereof as shown in Figs. 1 and 3 and snugs the mud hook device across the tread of the tire.

The outer end portion thereof may then be conveniently connected to the outer rim yoke 28, by first disassembling the outer hook member from the bracket 16 by loosening its screw 26 and then first inserting the hook portion 25 into the space between the outer yoke 28 and the outer rim edge 30 while disposing the hook device at the lowermost broken line attitude thereof shown in Fig. 1. Then the outer hook device is rotated inwardly toward the tire side wall until such time as the cross bar member 22 may then be slipped over the threaded portion 24 of the hook member. The nut 26 is then reapplied and tightened down so as to snug the entire mud hook device across the tread of the tire, and the mud hook device is then ready for operation. Detachment of the mud hook device may be conveniently effected by reversal of the operation described hereinabove, commencing with loosening of the outer nut 26 and disconnection of the outer yoke 16 from the hook device thereof so that both hook devices are freed to be rotated outwardly and into positions where they may be withdrawn from their corresponding yoke devices.

Thus, it will be seen that when the device of the invention is mounted upon a tire the centrifugal forces acting upon the cross chain device tending to pull upon the hook members outwardly radially of the vehicle wheel will be effectively resisted by reason of the abutment pressures of the heel portions of the hook members 25 against the rim edge portions 30. During such operation of the device the yoke members 28 operate primarily to retain the hook members 25 in nested relation under the rim edge portions 30 whereby the yoke members per se are substantially relieved of centrifugal forces tending to pull the mud hook device away from the rim. However, the yoke members 28 cooperate with the rim portion 30 during such operation of the device so as to distribute the loads therebetween.

As illustrated at Fig. 2, the end portions of the bracket legs 19—19 are reversely bent as indicated at 20 for slip-fitting connection through apertured portions of the cross bar 22; and as indicated on the drawing, the upturned end portions may be squeezed inwardly toward their corresponding leg portions by means of pliers or the like so as to prevent unintended subsequent disassembly of the parts. However, whenever it is required to replace one of the cross chain elements 14, for example, the end portions 29 may be simply straightened and then the bracket device 16 may be readily withdrawn from the cross arm 22 so that the worn out cross chain or chains may be slipped off the bracket 16 and replaced by new cross chains. The end portions 29 are then rebent as by means of pliers or the like to hold the unit in assembled condition.

As illustrated at Fig. 4, the hook portion 24 at the inside of the vehicle wheel may be formed with a modified type of hook end connection such as is designated 32. In this case the hook end portion 32 is arranged to pass first outside of the yoke member 28 and thence around the yoke body portion and then into the space between the yoke and the wheel rim. Thus, this hook device may be attached by simply reaching around the vehicle tire and drawing the hook device into connection with the yoke member, and then tensioning the cross chain device across the tread of the tire and fastening the other end of the device to the opposite yoke member as explained hereinabove.

Thus, it will be seen that the present invention provides improved ease of attachment and detachment of the mud hook device as well as an improved holding hook construction which directs the forces tending to "throw" the mud hook device against the rim structure of the mounting wheel under operating conditions. Also, the invention features convenience for replacement of worn out cross chain elements, and incorporation at each end of the mud hook device of an improved bracket device which functions both as a cross chain carrier and a handle device to facilitate manual manipulation of the device during attachment and detachment operations.

The handle portion 17 of the bracket 16 functions to stiffen the bracket laterally and firmly maintains the paired cross chains 14—14 in spaced relation. The threaded stem portions 24 of the hook devices 25 afford wide ranges of adjustments so that the cross chains 14 may be always maintained in tight condition on the tread of the tire.

It will of course be appreciated that although only one form of the invention has been shown and described in detail, it will be apparent to those skilled in the art that the invention is not so limited but that various changes may be made therein without departing from the spirit of the invention or the scope of the appended claims.

I claim:

1. A mud hook device for attachment to a pneumatic tire wheel rim carrying paired yoke devices at opposite sides thereof adjacent to, spaced from and under the outturned rim edge portions thereof, said mud hook device comprising a cross chain element adapted to stretch across the tread portion of the vehicle tire, a bent wire bracket member connected into each end of said cross chain element and extending therefrom into connection with a cross bar element, a hook member positioned at each of said cross bar elements and comprising in each case a threaded stem portion and a hook head portion integral therewith, said stem portions being inserted through apertured portions of said cross bar members and having nuts threaded thereon for retaining said hook members relative to said cross bar members, said hook head portions being C-shaped in edge view to slip-fit into the spaces between said yoke members and the outer turned edges of said rim and to rotate therewithin.

2. A mud hook device for attachment to a pneumatic tire wheel rim carrying paired yoke devices at opposite sides thereof adjacent to, spaced from and under the outturned rim edge portions thereof, said mud hook device comprising a pair of cross chain elements adapted to stretch in parallel relation across the tread portion of the vehicle tire, a bent wire bracket member interconnecting the corresponding ends of said cross chain elements and extending therefrom into connection with a cross bar element, a hook member positioned centrally of each of said cross bar elements and comprising in each case a threaded stem portion and a hook head portion integral therewith, said stem portions being inserted through apertured portions of said cross bar members and having nuts threaded thereon for retaining said hook members relative to said cross bar members, said hook head portions being C-shaped in edge view to slip-fit into the spaces between said yoke members and the outer turned edges of said rim and to rotate therewithin.

HENRY R. RICHARDS.

References Cited in the file of this patent

UNITED STATES PATENTS

| Number | Name | Date |
|---|---|---|
| 1,390,893 | Elliott | Sept. 13, 1921 |
| 1,529,558 | Staggers | Mar. 10, 1925 |
| 1,661,910 | Quisling | Mar. 6, 1928 |
| 2,091,171 | Watson | Aug. 24, 1937 |
| 2,292,215 | Dobrokhotoff | Aug. 4, 1942 |
| 2,344,971 | Copp | Mar. 28, 1944 |
| 2,504,032 | Massey | Apr. 11, 1950 |
| 2,539,517 | Locke | Jan. 30, 1951 |